US008065859B1

(12) United States Patent
Wingert

(10) Patent No.: US 8,065,859 B1
(45) Date of Patent: Nov. 29, 2011

(54) AGRICULTURAL BAGGER WITH DUAL ROTOR AND/OR VARIABLE-TAPER TUNNEL

(76) Inventor: Paul R. Wingert, Plainview, MN (US)

( * ) Notice: Subject to any disclaimer, the term of this patent is extended or adjusted under 35 U.S.C. 154(b) by 0 days.

(21) Appl. No.: 12/141,044

(22) Filed: Jun. 17, 2008

Related U.S. Application Data

(63) Continuation of application No. 11/944,599, filed on Nov. 23, 2007, now abandoned, which is a continuation of application No. 11/345,059, filed on Jan. 31, 2006, now abandoned.

(60) Provisional application No. 60/648,833, filed on Jan. 31, 2005.

(51) Int. Cl.
*B65B 63/02* (2006.01)

(52) U.S. Cl. .............. 53/439; 53/473; 53/459; 53/527; 53/530; 100/41; 100/191; 100/226; 100/242; 141/114

(58) Field of Classification Search .......... 53/257, 53/439, 459, 530, 567, 570, 576; 100/41, 100/65, 177, 226, 242, 189, 191; 141/114, 141/313; 56/341, 344

See application file for complete search history.

(56) References Cited

U.S. PATENT DOCUMENTS

| | | | |
|---|---|---|---|
| 2,552,888 A | 5/1951 | Druetta | |
| 3,022,723 A | 2/1962 | Templeton | |
| 3,070,006 A * | 12/1962 | Raney et al. | 100/192 |
| 3,179,131 A | 4/1965 | Kissling | |
| 3,479,950 A | 11/1969 | Freeman | |
| 3,613,926 A | 10/1971 | Scroggins | |
| 3,757,501 A | 9/1973 | Bennett, Jr. et al. | |
| 3,771,733 A | 11/1973 | Hadley | |
| 3,783,578 A | 1/1974 | Willis et al. | |
| 3,876,055 A | 4/1975 | Tyznik | |
| 3,881,407 A | 5/1975 | Goar | |
| 3,884,395 A | 5/1975 | Keenan | |
| 4,033,101 A | 7/1977 | Fritz et al. | |
| 4,046,068 A | 9/1977 | Eggenmuller et al. | |
| 4,072,273 A | 2/1978 | Reiniger | |
| 4,095,604 A | 6/1978 | Labbe | |
| 4,100,023 A | 7/1978 | McDonald | |
| 4,241,562 A | 12/1980 | Meyer | |

(Continued)

FOREIGN PATENT DOCUMENTS

DE 3619251 12/1987

*Primary Examiner* — Thanh Truong
(74) *Attorney, Agent, or Firm* — Charles A. Lemaire; Jonathan M. Rixen; Lemaire Patent Law Firm, P.L.L.C.

(57) ABSTRACT

An agricultural bagger apparatus and method for compacting feed into a horizontally deployed bag including a moving hopper wall and mechanism for moving the wall at an input end of hopper. The wall moving mechanism and the moving wall of the hopper sweeps the feed adjacent to the sloping wall to prevent feed bridging. A safety enclosure isolates the wall moving mechanism from contaminants and prevents exposure to the wall moving mechanism. Some embodiments also compact feed in the upper portion of a tunnel, for example, by reciprocating a hinged piston above a primary compression mechanism. A tunnel-adjustment mechanism varies a cross-section area of the tunnel exit in order to control the amount of compaction on the feed as it leaves the tunnel and enters the bag. In some embodiments, dual counter-rotating toothed compression mechanism force feed between the rotors and into the tunnel at a rate and pressure greater than what is possible with only one multiple-toothed compressor rotor.

22 Claims, 9 Drawing Sheets

U.S. PATENT DOCUMENTS

| | | |
|---|---|---|
| 4,310,036 A | 1/1982 | Rasmussen et al. |
| 4,337,805 A | 7/1982 | Johnson et al. |
| 4,344,580 A | 8/1982 | Hoshall et al. |
| 4,489,648 A | 12/1984 | Naaktgeboren |
| 4,501,382 A | 2/1985 | van Twuyver |
| 4,502,378 A | 3/1985 | Cullen |
| 4,548,131 A | 10/1985 | Williams |
| 4,584,790 A | 4/1986 | Gaughen |
| 4,611,642 A | 9/1986 | Durhman |
| 4,621,666 A | 11/1986 | Ryan |
| 4,672,794 A | 6/1987 | Good |
| 4,686,817 A | 8/1987 | Brodrecht et al. |
| 4,688,480 A | 8/1987 | Ryan |
| 4,712,362 A | 12/1987 | Cornet et al. |
| 4,721,503 A | 1/1988 | Rasmussen et al. |
| 4,724,876 A | 2/1988 | Ryan |
| 4,766,717 A | 8/1988 | Thomann |
| 4,803,832 A | 2/1989 | Crawford |
| 4,829,895 A | 5/1989 | Juhuku |
| 4,867,736 A | 9/1989 | Rasmussen et al. |
| 4,896,593 A | 1/1990 | Slusser |
| 4,899,867 A | 2/1990 | Ryan |
| 4,907,503 A | 3/1990 | Ryan |
| 4,949,633 A | 8/1990 | Johnson et al. |
| 4,955,188 A | 9/1990 | von Allworden |
| 5,113,917 A | 5/1992 | McGregor |
| 5,123,338 A | 6/1992 | Mathis |
| 5,140,802 A | 8/1992 | Inman et al. |
| 5,151,000 A | 9/1992 | Geraghty et al. |
| 5,155,975 A | 10/1992 | Knowler |
| 5,178,061 A | 1/1993 | Alonso-Amelot |
| 5,197,682 A | 3/1993 | Del Zotto |
| 5,213,143 A | 5/1993 | Policky et al. |
| 5,215,228 A | 6/1993 | Andrews et al. |
| 5,220,772 A | 6/1993 | Koskela et al. |
| 5,253,570 A | 10/1993 | Roeckner |
| 5,295,554 A | 3/1994 | Cullen |
| 5,297,377 A | 3/1994 | Cullen |
| 5,313,768 A | 5/1994 | Cullen |
| 5,345,744 A | 9/1994 | Cullen |
| 5,355,659 A | 10/1994 | Cullen |
| 5,367,860 A | 11/1994 | Cullen |
| 5,396,753 A | 3/1995 | Cullen |
| 5,398,487 A * | 3/1995 | Inman et al. .................. 53/567 |
| 5,398,736 A | 3/1995 | Cullen |
| 5,408,809 A | 4/1995 | Cullen |
| 5,408,810 A | 4/1995 | Cullen |
| 5,413,155 A | 5/1995 | Ryan |
| 5,419,102 A | 5/1995 | Inman et al. |
| 5,421,142 A | 6/1995 | Cullen |
| 5,425,220 A | 6/1995 | Cullen |
| 5,426,910 A | 6/1995 | Cullen |
| 5,452,562 A | 9/1995 | Cullen |
| 5,461,843 A | 10/1995 | Garvin et al. |
| 5,463,849 A | 11/1995 | Cullen |
| 5,464,049 A | 11/1995 | Cullen |
| 5,469,693 A | 11/1995 | Brodrecht |
| 5,517,806 A | 5/1996 | Cullen |
| 5,519,990 A | 5/1996 | Rodewald et al. |
| 5,566,532 A | 10/1996 | Inman et al. |
| 5,570,565 A | 11/1996 | Simpson |
| 5,724,793 A | 3/1998 | Inman et al. |
| 5,735,199 A | 4/1998 | Esau et al. |
| 5,799,472 A | 9/1998 | Cullen |
| 5,819,643 A | 10/1998 | McIlwain et al. |
| 5,860,271 A | 1/1999 | Inman et al. |
| 5,878,552 A | 3/1999 | Wingert |
| 5,894,713 A | 4/1999 | Cullen |
| 6,026,741 A | 2/2000 | Lippens et al. |
| 6,061,999 A | 5/2000 | Wingert |
| 6,379,086 B1 | 4/2002 | Goth |
| 6,430,897 B1 | 8/2002 | Cameron et al. |
| 6,516,590 B2 | 2/2003 | Inman et al. |
| 6,708,851 B2 | 3/2004 | DaSilva |
| 7,024,839 B2 | 4/2006 | Wingert |

\* cited by examiner

AGRICULTURAL BAGGER WITH DUAL ROTOR AND/OR VARIABLE-TAPER TUNNEL

CROSS-REFERENCE TO RELATED APPLICATIONS

This application is a continuation of U.S. patent application Ser. No. 11/944,599 filed Nov. 23, 2007, which is a continuation of U.S. patent application Ser. No. 11/345,059 filed Jan. 31, 2006, which claimed benefit of U.S. Provisional Patent Application No. 60/648,833 filed Jan. 31, 2005, each of which is hereby incorporated by reference in its entirety.

This invention also is related to the following six patent applications:
U.S. Ser. No. 08/904,160 filed Jul. 31, 1997, now U.S. Pat. No. 5,878,552 issued Mar. 9, 1999 to Paul R. Wingert;
U.S. Ser. No. 09/175,821 filed Oct. 20, 1998, now U.S. Pat. No. 6,061,999 issued May 16, 2000 to Paul R. Wingert;
U.S. Ser. No. 09/571,424 filed May 15, 2000, now U.S. Pat. No. 6,516,586 issued Feb. 11, 2003 to Paul R. Wingert;
U.S. Ser. No. 09/721,268 filed Nov. 22, 2000, now U.S. Pat. No. 6,672,034 issued Jan. 6, 2004 to Paul R. Wingert;
U.S. Ser. No. 09/977,036 filed Oct. 11, 2001, now U.S. Pat. No. 7,024,839 issued Apr. 11, 2006 to Paul R. Wingert; and
U.S. Ser. No. 10/848,239 filed May 16, 2004, now U.S. Pat. No. 7,266,936 issued Sep. 11, 2007 to Paul R. Wingert;
each of which is hereby incorporated by reference in its entirety.

FIELD OF THE INVENTION

This invention relates to the field of agricultural baggers, and more specifically to a method and apparatus for more efficiently compacting feed into the tunnel using two or more rotors, and providing a variable taper to the extrusion tunnel.

BACKGROUND OF THE INVENTION

Horizontally expandable, silage storage bags are commonly used as an alternative to permanent feed storage structures such as barns and silos. From an economic standpoint, an expandable plastic storage bag is preferable to a more elaborate, permanent structure. Further, the expandable bags are more easily loaded with feed than permanent structure and the silage stored therein is readily accessible for use, for example using a small tractor with a front bucket to unload the feed.

An exemplary prior art bagger is described in U.S. Pat. No. 5,878,552 (which patent is incorporated herein in its entirety by reference), to Paul R. Wingert, the present applicant. A tractor-powered bag-loading apparatus is disclosed in association with an expandable bag. A backstop is located at the filled end of the bag and has attached thereto laterally spaced cables, which extend forward to rotatable cable drums on the bagger machine. The drums are yieldably braked and, under a predetermined force applied to the cables, release the cable to allow movement of the bag-loading apparatus and tractor away from the filled end of the bag as it is filled. The bag is filled by a toothed rotor, which propels silage through a tapered tunnel and into the bag inlet. The tapered tunnel described in U.S. Pat. No. 5,878,552 provides a smooth, more evenly filled bag.

The bag for use with such bagging machines is manufactured and delivered in a pleated shape, i.e., folded into an accordion-bellows-type shape. Typically, a bag having a nominal ten-foot-diameter (approximately 3 meters diameter, or 9.6 meters circumference) and a 300-foot length (approximately 90 meters length) will be folded to a 10-foot-diameter (about 3 meters) ring about one foot (about 0.3 meter) long and 1 foot (about 0.3 meter) thick. To start the loading operation, this bag-ring is pre-loaded around the tunnel, and the pleats are unfolded one at a time as the bag is deployed and filled with feedstock. Once any portion of the bag fills with feed, that portion becomes very heavy, and does not move. Thus the bagger machine itself is propelled along the ground in front of the bag being filled.

One exemplary bagging machine is described in U.S. patent application Ser. No. 09/721,268 filed on Nov. 22, 2000, entitled "Improved Agricultural Feed Bagger and Method" by Paul R. Wingert, the inventor of the present application. U.S. patent application Ser. No. 09/721,268 is incorporated in its entirety by reference. In some embodiments of the present invention, a large conveyer-belt bed, as described in U.S. patent application Ser. No. 09/721,268, is provided for loading voluminous quantities of agricultural material into its hopper.

One contends with numerous problems in using previous bagging structures. For example, there is a safety problem caused by feed that bridges within the tapered input hopper. Persons may be tempted to unclog the hopper by stomping or otherwise inserting an arm or a leg thus risking being sucked through and shredded by the primary compression mechanism. U.S. patent application Ser. No. 09/977,036 (incorporated herein by reference) filed Oct. 11, 2001 by Paul R. Wingert, the inventor of the present invention, provided several embodiments that churned the feed to prevent bridging of feed in the input hopper, and that had fixed safety shields over portions of the moving parts. Apparatus and methods for increasing compaction in the upper tunnel were also described.

As more fully described in patent application Ser. No. 09/977,036, one way to help prevent bridging is to churn or move the feed in hopper, for example using an arm that moves in a curvical motion, since it is connected to arm that moves in a circular motion driven by motor (e.g., a hydraulic motor, in some embodiments), and arm is also connected to arm that moves in a wiper-blade motion. Thus the curvical motion of arm helps prevent feed from bridging against sloping wall by moving feed towards rotor. Sloping shield wall provided additional safety by enclosing much of the moving part of the arm, and much or all of arms and. However, now bridging could occur against the stationary sloping shield wall, although this was further from rotor and at a portion of chute that was larger in cross sectional area, so the bridging problem was reduced.

Conventional baggers also suffer from an inability to adequately compact feed in the upper and lower portions of the tunnel, thus leaving the feed in the lower bag highly compacted and the feed in the upper bag only moderately compacted. Conventional baggers also suffer from inability to efficiently force large amounts of feed into the bag while providing a variable control on the tunnel opening to control the amount of feed compaction.

BRIEF SUMMARY OF THE INVENTION

The invention provides an agricultural bagger apparatus for compacting feed into a horizontally deployed bag. The apparatus includes a primary compression mechanism and an input hopper that receives agricultural feed. The hopper has a sloping wall and a lower-end exit chute located to transfer the agricultural feed into the primary compression mechanism. The apparatus also includes a moving wall as at least part of the sloping inside wall of the input hopper to move the agricultural feed that was adjacent to the sloping wall toward the primary compression mechanism in order to prevent feed bridging in the hopper before the primary compression mechanism.

One aspect of the invention includes an adjustable tunnel with the ability to vary the area of the feed-output extrusion end of the tunnel, and thus control the amount of compaction of the feed (i.e., by changing the amount of backpressure exerted by the walls of the tunnel.

Another aspect of the invention is a method that improves the flow of agricultural feed in an agricultural feed stock bagging machine having a tunnel and a primary compression mechanism fed by a hopper with a sloping wall. The feed is deposited into a hopper and pressure within the feed along the sloping wall is displaced and feed is swept along by the moving wall to reduce the tendency for the feed to bridge in the hopper in order that the feed continuously flows toward the primary compression mechanism. This is a further safety innovation to prevent a situation where a bagger machine operator might otherwise climb into the input hopper in a dangerous attempt to free the bridged feed and restart the flow of feed through the hopper. By preventing the clogged feed, there is even less motivation for a person to foolishly insert an arm or foot into the hopper.

Yet another aspect of the invention provides a method for extruding into a feedbag connected to a feed tunnel. The method includes deploying the bag from a position substantially at the back edge of the primary compression such that the lower portion of the feed drops substantially to ground level within the bag as soon as it leaves the primary compression stage. The exit surface between the exit end of the tunnel under the hopper and the ground is substantially vertical. This further compresses the feed in the lower bag, since it does not need to be pushed across a sloping lower exit surface after leaving the primary compression stage. Some embodiment also include compacting feed from the upper portion of the tunnel toward the upper central portion of the tunnel, and displacing pressure from the mid-level portion of the tunnel just above the primary compression stage and into the upper portion of the tunnel. In some embodiments, the compacting feed from the upper portion of the tunnel further includes reciprocating a piston connected to a hinged apparatus above the primary compression mechanism to displace pressure inside the feed tunnel above the primary compression mechanism. This increases the compaction on the top portion of the tunnel without unduly juicing the feed.

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component, which appears in multiple Figures. Signals and connections may be referred to by the same reference number or label, and the actual meaning will be clear from its use in the context of the description.

Figure 1:
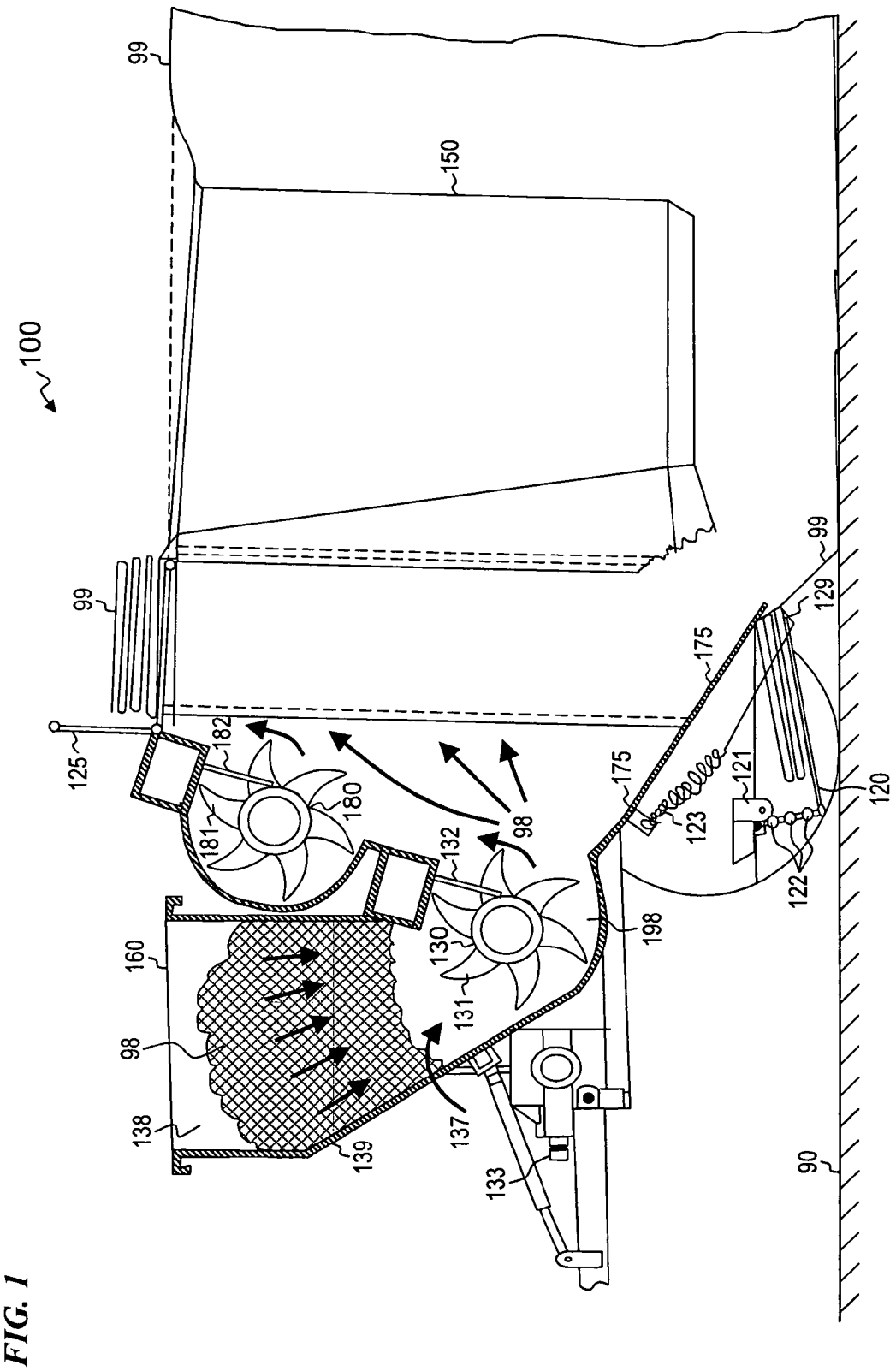
FIG. 1 is a side view of a bagging machine 100.

FIG. 1 is a side view of a bagger 100 (also called feed-bagging machine 100). The feed bagger 100 is not pulled, rather, the pressure from the feed 98 filling the bag 99 pushes the bagger 100 and the tractor (not shown) that is powering bagger 100 ahead at a rate equal to the filling rate of bag 99. A steel cable between bagger 100 and a backstop (not shown, but which is to the right of the apparatus and bag shown in FIG. 1) is yieldably held by a disk-brake mechanism. This ensures the feed is compacted before the bagger is allowed to advance. The primary compression mechanism includes a rotor 130 having multiple teeth 131, and powered by a power-take-off (PTO) shaft 133 from the tractor that powers bagger 100, forces feed 98 up and back into a tunnel 150. In some embodiments, tunnel 150 is a long tapered tunnel such as described in U.S. Pat. No. 5,878,552 by the inventor of the present invention, hereby incorporated by its entirety by reference. In other embodiments, tunnel 150 is a variable-orifice tunnel as described in FIGS. 4 and 5A below.

Movable upper bag bracket 125 is used to lift the folded bag 99 into place on the outside of tunnel 150, and supports/holds the folded bag 99 at the front end of the top of tunnel 150 as it unfolds from the inside of the folded bag. Lower bag tray 120 is tilted up at its trailing edge 129, supported at its front edge by brackets 121 connected to one of a plurality of rungs 122 (for adjustability), and yieldably supported at its back edge by spring-and-chain 123 (which can have its force adjusted by setting various chain links of the chain onto a fixed hook at the top). The input feed 98 is dropped into hopper 160. Such a bagger 100 has a tunnel 150 that provides some support for bag 99 as it unfolds, but which has side walls along which the bag unfolds that are ovoid or tapered inward at the back such that the bag is stretched slightly and then released as it passes over tunnel 150 that moves in the direction of travel of the bagger 100. The bag 99, once deployed and filled with feed does not move relative to ground 90. The bagger tunnel 150 provides some backpressure to the feed, which thus extrudes into the bag rearward at a substantially constant pressure.

The agricultural feed 98, which is input to the hopper 160, falls toward the primary compression mechanism 130. The primary compression mechanism 130 includes a series or a plurality of teeth 131. The teeth force the feed in the upper portion of the hopper 160 to an outlet or exit end 198. As the bagger mechanism 100 also includes a comb 132, tines of which are positioned between the teeth 131 of the rotor 130. The comb 132 removes material or feed 98 from between various teeth 131 on the rotor 130, and compacts the feed into the tunnel 150. Thus, the comb 132 prevents the clogging of the rotor and specifically the jamming of agricultural material between the teeth 131 of the rotor 130. The rotor 130 turns in a counterclockwise direction (in this FIG. 1) and outputs feed at an output end 198. The output feed 98 as depicted by a variety of arrows near the output end 198 of the rotor mechanism forces the feed into the tunnel 150. At the bottom of the output end 198 is an exit surface 175. As shown in FIG. 1, the exit surface 175 slopes from the output end 198 of the rotor to the tunnel 150. The exit surface 175 fits inside the tunnel 150. In some embodiments, tapered hopper 160 has a sloping front wall 139, which can cause bridging of the feed in hopper 160, leaving a small gap 137 between the bottom of the feed and the compression rotor 130. Some embodiments In some embodiments, the bagger 100 also includes an upper bag compression mechanism 180. In some embodiments, compression mechanism 180 is a toothed cylinder with teeth 181 and comb 182, similar to cylinder 130 and comb 132. In other embodiments, a reciprocating piston such as described in FIG. 1 of patent application Ser. No. 10/818,239 filed May 16, 2004, which application is incorporated herein by reference. It should be noted that the term "piston" is defined as any mechanism that reciprocates between a compressed position and a withdrawn position. Such a piston is typically plate steel fabricated to a solid external shape that can be extended into a body of feed to compact the feed and then withdrawn to a position that allows additional feed into the volume that the wedge used to occupy. In this description, the term "wedge piston" is defined as any hinged mechanism that reciprocates between a compressed position and a withdrawn position. Such a wedge piston is typically plate steel fabricated to a solid external shape that can be extended into a body of feed to compact the feed and then withdrawn to a position that allows additional feed into the volume that the wedge used to occupy.

Figure 2:
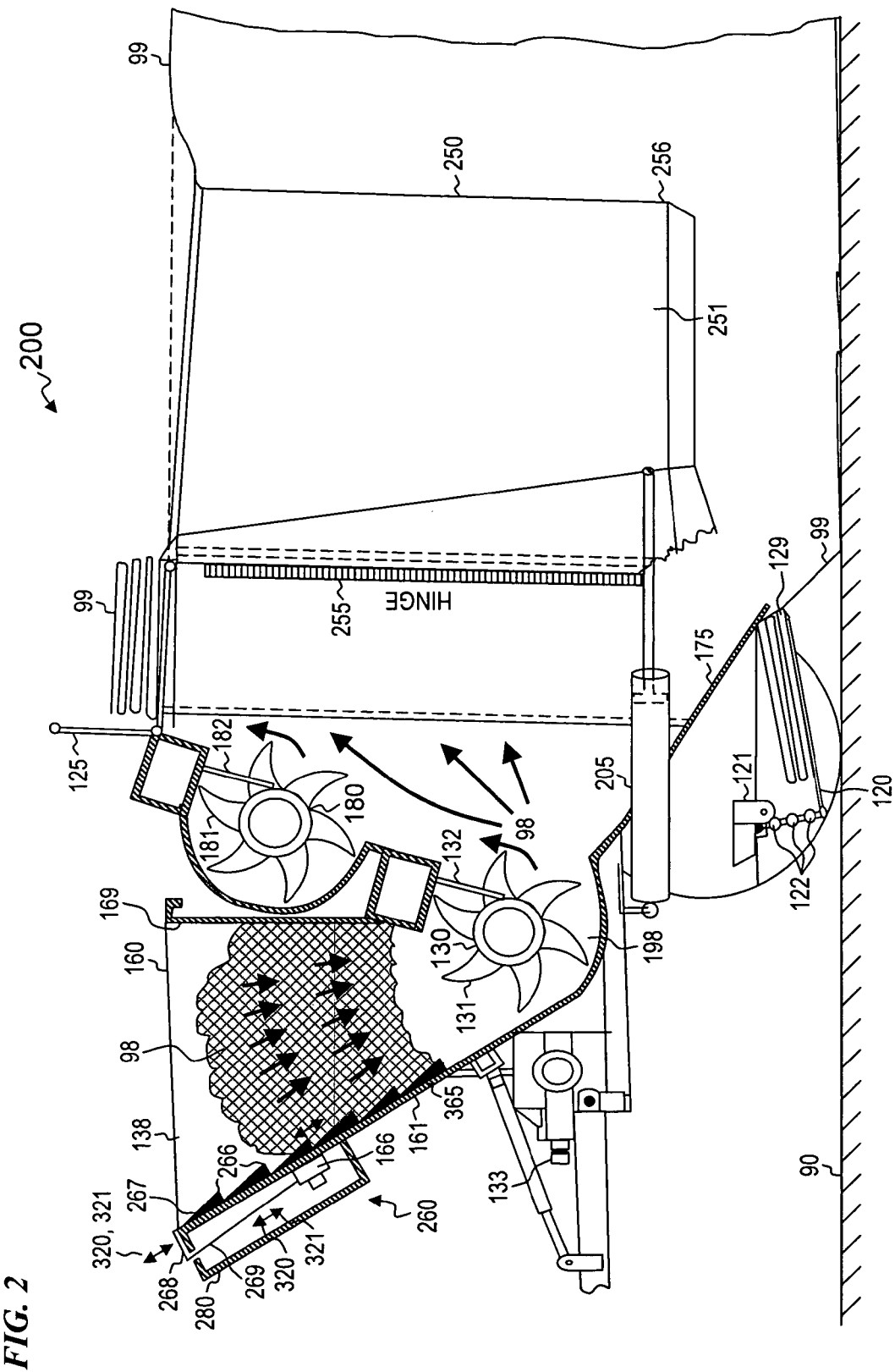
FIG. 2 is a side view of a bagging machine 200, according to an embodiment of this invention.

FIG. 2 is a side view of a bagging machine 200, according to an embodiment of this invention. In some embodiments, a hydraulic cylinder 205 is provided to vary the width of tunnel 250. In some embodiments, as hydraulic cylinder 205 extends it forces backward the outer point of the tunnel, which pivots on hinge 255, force the back edge 256 of the sidewall of 251 of tunnel 250 to pivot inward, rather than slide together. This reduces the area of the back end of tunnel 250, thus increasing the backpressure on the feed 98 and increasing the compaction factor on the feed 98. It also keeps the slight stretch of the bag 99 over the widest dimension of the tunnel. In some embodiments, the operation of the hydraulic cylinders 205 is varied and controlled in order to adjust and/or maintain the desired compaction factor. In other embodiments, the two halves of the tunnel slide towards and away from each other, in order to control the backpressure on the feed 98 in the tunnel. In some embodiments, the width of the tunnel resulting from sliding the two halves back or forth is varied and controlled in order to adjust and/or maintain the desired compaction factor. Several aspects of the bagging machine 200 are the same as the description of the elements of bagging machine 100. Rather than repeat the description of the similar elements, the differences between bagging machine 200 and bagging machine 100 will be stressed.

The bagging machine 200 includes a hopper 160 having a reciprocating hopper wall 267 and a fixed back wall 169. The moving sloped wall 267 moves with respect to a fixed sloped wall 161 of the hopper 160. The moving sloped wall 267 is an inverted J-shaped wall having ridges 266. Substantially the entire wall or a major portion of the moving sloped wall 267 moves (i.e., the portion that contacts the input feed 98). The moving sloped wall 267 is moved by a wall moving mechanism 260. The J-shaped moving sloped wall 267 includes an end wall 268 and an outside wall 269. The end wall 268 forms the top of the inverted J-shape, while the outside wall 269 forms the shorter down turned end of the J-shape. Affixed to the fixed wall 161 of the hopper 160 is a plastic bearing surface 365. The moving sloped wall 267 moves or oscillates along a path depicted by arrows 320 and 321. The motor 166 is rotated to move wall 267 up and down.

In some embodiments, safety enclosure 280 is placed over the wall moving mechanism 260. One purpose of the safety enclosure 280 is to prevent exposure of the operator to the rotating parts of the wall moving mechanism 260. Yet another purpose of the safety enclosure is to isolate the wall moving mechanism 260 from feed and other debris that may result from placing feed 98 into the input end of the hopper 160. Therefore, the safety enclosure 280 is not only for safety but also is for reducing the number of contaminants to which the wall moving mechanism 260 is exposed.

Similar to the bagger mechanism 100 of FIG. 1, the hopper 160 has an output end 198 which forces feed into the tunnel 150. The bagging machine 200 also includes an upper bag compression mechanism 180. The rotor 130 includes teeth 131. The bagging mechanism 200 includes a comb 132, which cleans feed 98 that is passing from the input end of the hopper 160 to the output end 198 of the rotor 130 from teeth 131 and forces the feed into tunnel 250.

Figure 3:
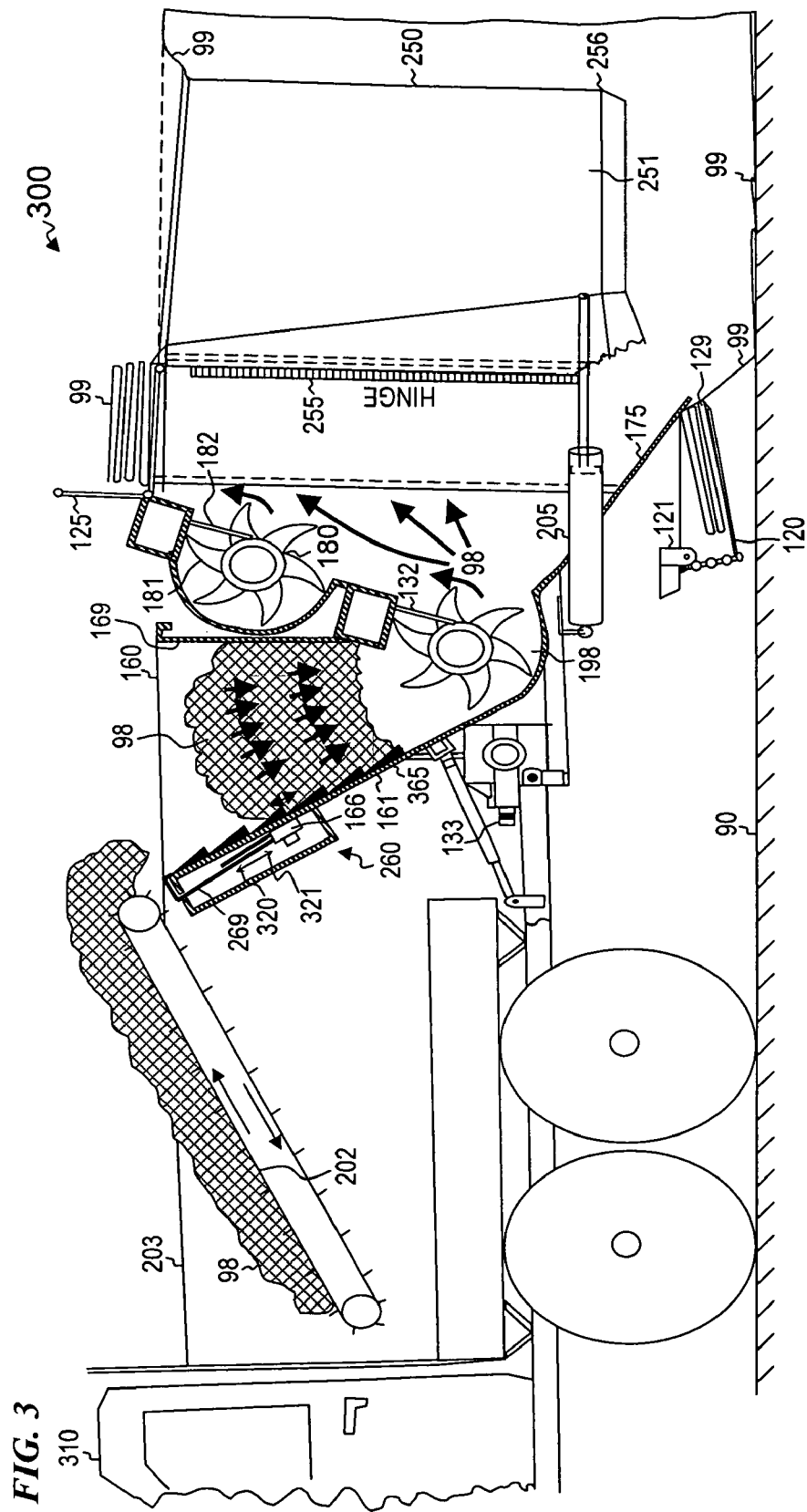
FIG. 3 is a side view of a bagging machine 300, according to an embodiment of this invention.

FIG. 3 is a side view of a bagging machine 300, according to some embodiments of the invention. The bagging machine 300 includes a feed-deposit table 203 having a moving conveyor 202 that conveys feed towards input hopper 160. For example, in some embodiments, feed-deposit table 203 is the truck bed of a truck 310, to which the bagger machine is attached, while in other embodiments, feed-deposit table is a trailer that is independently moved into position in front of (to the left in the Figure) the bagger machine. In some embodiments, truck 310 and feed-deposit table 203 are combined with other bagger configurations described herein. Other aspects of machine 300 are as described in FIG. 2. Feed deposit table 203 allows a large amount of feed to be dumped and fed into input hopper 160, thus reducing the amount of labor needed to fill the hopper 160.

Figure 4:
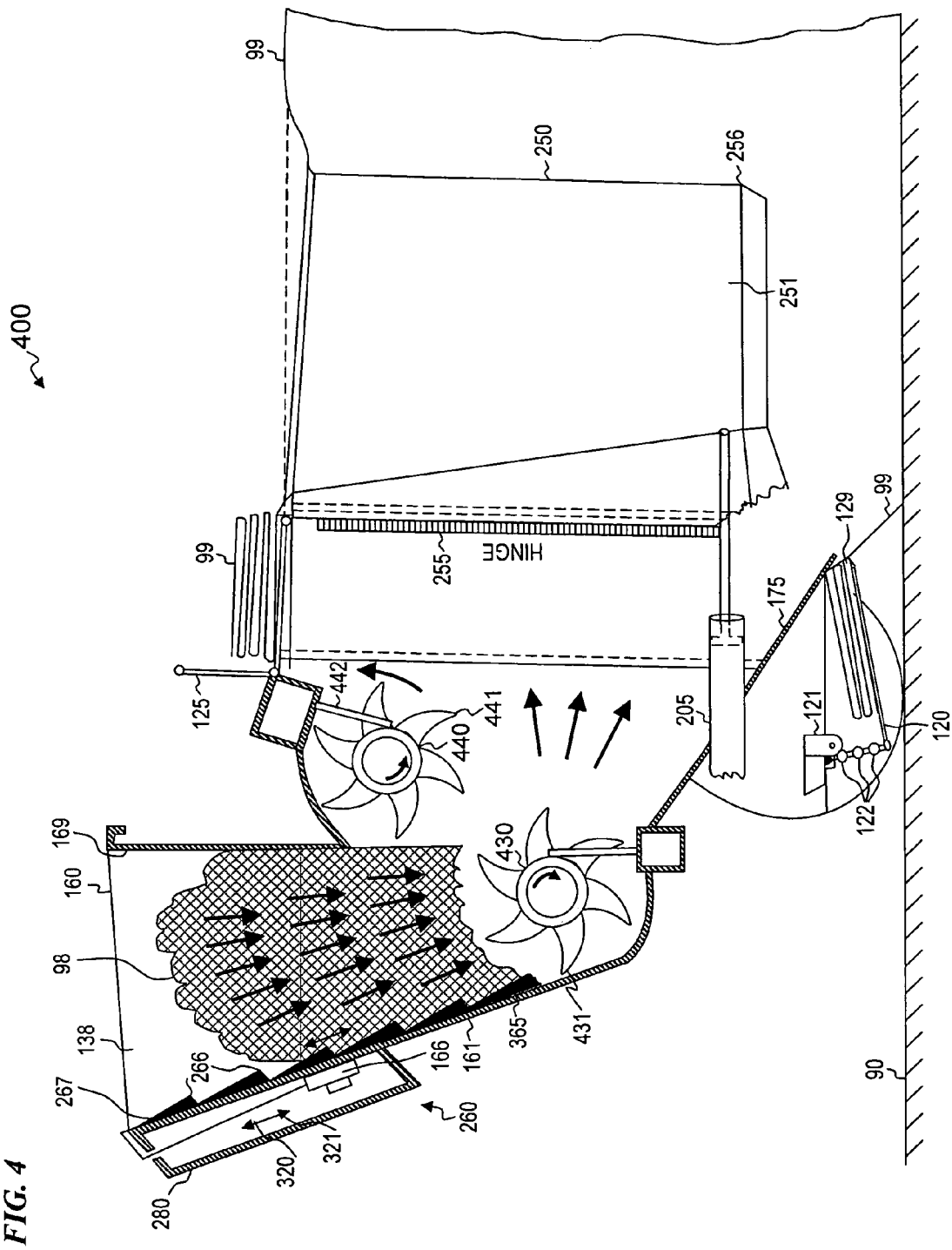
FIG. 4 is a side view of a bagging machine 400, according to another embodiment of this invention.

FIG. 4 is a side view of a bagging machine 400, according to another embodiment of this invention. Many aspects of the bagging machine 400 are similar to the aspects of the bagging machine 200 of FIG. 2. The bagging mechanism 400 includes a reciprocating moving sloped wall 267. The moving sloping wall 267 helps to prevent a bridge or bridging 95 of the feed 98 in the hopper 160. In this particular embodiment of the invention, the elongated wall of the moving sloping wall 267 is provided with a plurality of ridges 266. The ridges 266 form a plurality of additional ledges or pushing surfaces that compact the feed or push the feed in the hopper 160 toward the primary rotor compression device 430, which rotor is rotating in a clockwise direction relative to the FIG. 4. A second rotor 440 is situated above rotor 430 but rotates in a counter clockwise direction. This forces feed 98 between the rotors 430 and 440 and into tunnel 250 at a much faster rate than is possible with a single rotor. In some embodiments, rotors 430 and 440 are placed far enough apart such that there is clearance (e.g., about one to three centimeters, or about one-half to one inch, or so) between the teeth 431 of rotor 430 and teeth 441 of rotor 440 regardless of the relative angles of the rotors or their motions.

Figure 5:
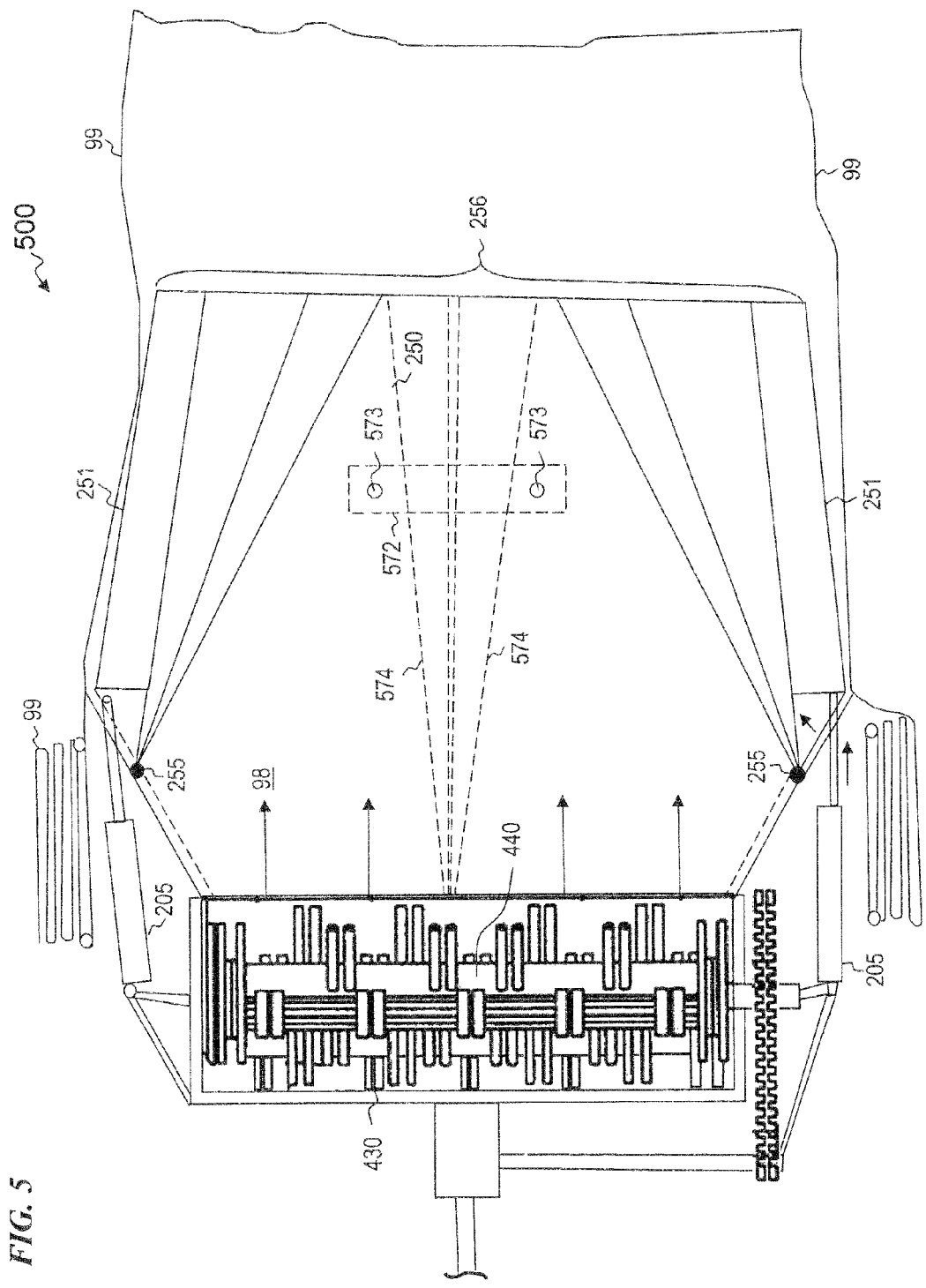
FIG. 5 is a top view of a bagging machine 500, according to still another embodiment of this invention, with the sidewalls in the wide position.

FIG. 5 is a top view of a bagging machine 500, according to still another embodiment of this invention. In this embodiment, the exit opening 256 of the tunnel 250 (i.e., the end farthest from compressor 430) has an adjustable cross sectional area or opening. Hydraulic cylinders 205 are shown in their retracted or non-extended positions, and thus side walls 251 are in their outward most positions, providing the least amount of backpressure and compaction to feed 98. As hydraulic cylinders 205 are extended, they rotate sidewalls 251 inward, as shown in FIG. 6.

Figure 6:
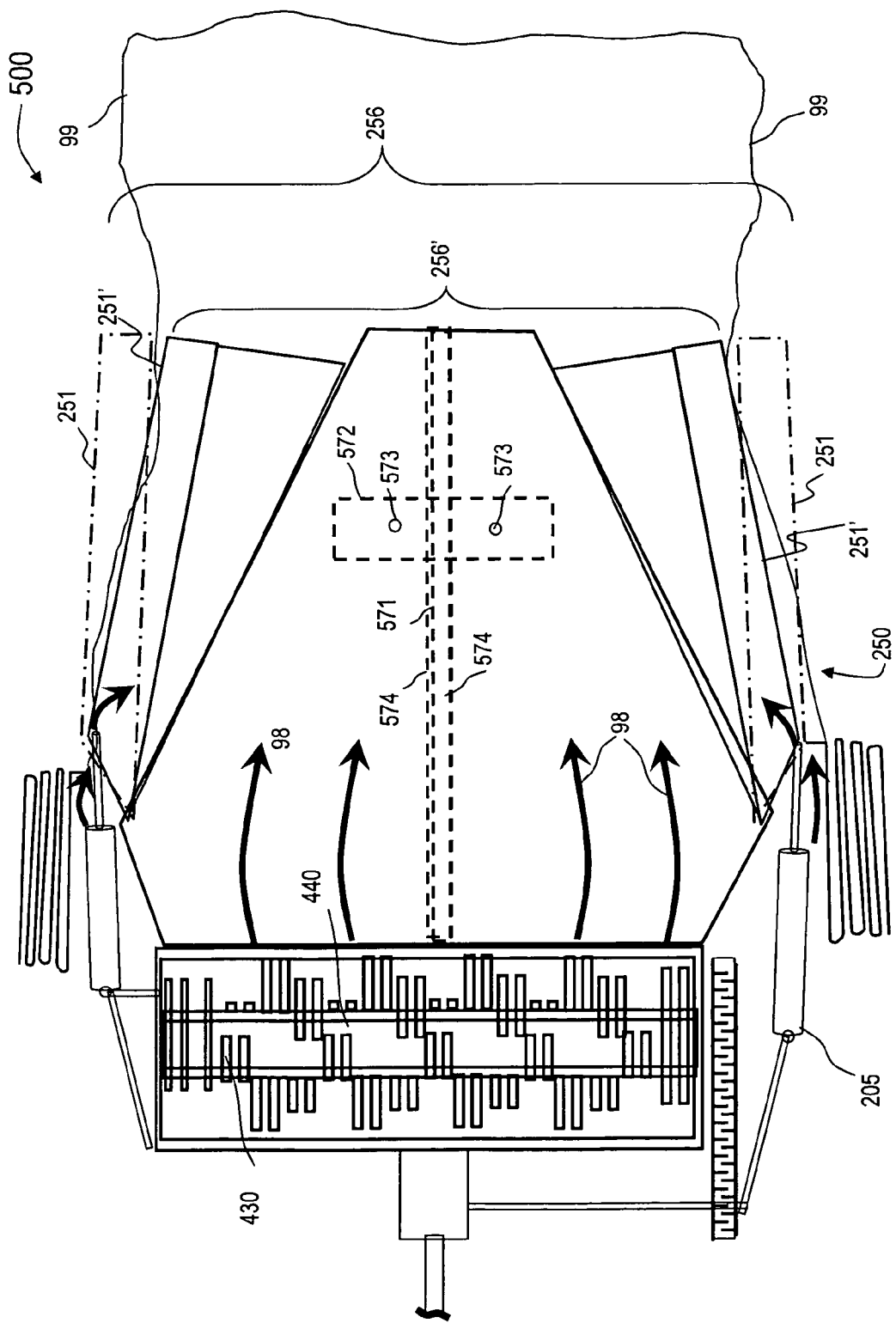
FIG. 6 is a top view of a bagging machine 500, showing the sidewalls in a narrowed position.

FIG. 6 is a top view of a bagging machine 500 of FIG. 5. In this view, cylinders 205 are shown in their extended position, and thus the exit opening 256 is reduced in area. The dotted line 251' shows the position of sidewalls in their outwardly extended positions. The exit opening 256' has a smaller area as compared to the exit area 256 of FIG. 5. This provides greater backpressure on the feed, thus increasing the degree of compaction of the feed 98 in the tunnel 250. As hydraulic cylinders 205 are extended, they have rotated sidewalls 251 inward, and top portion 574 slides inward parallel to the top wall 257. In some embodiments, the amount of cylinder extension and thus the amount of tunnel exit area reduction, is continuously variable, in order to provide a smooth variability in the amount of compaction. In some embodiments, the position of the sidewalls 251 is kept constant for the entire length of the bag filling. In other embodiments, the position of the sidewalls is varied along the length of the bag in order to provide the desired amount of compaction at each position along the bag 99.

Figure 7:
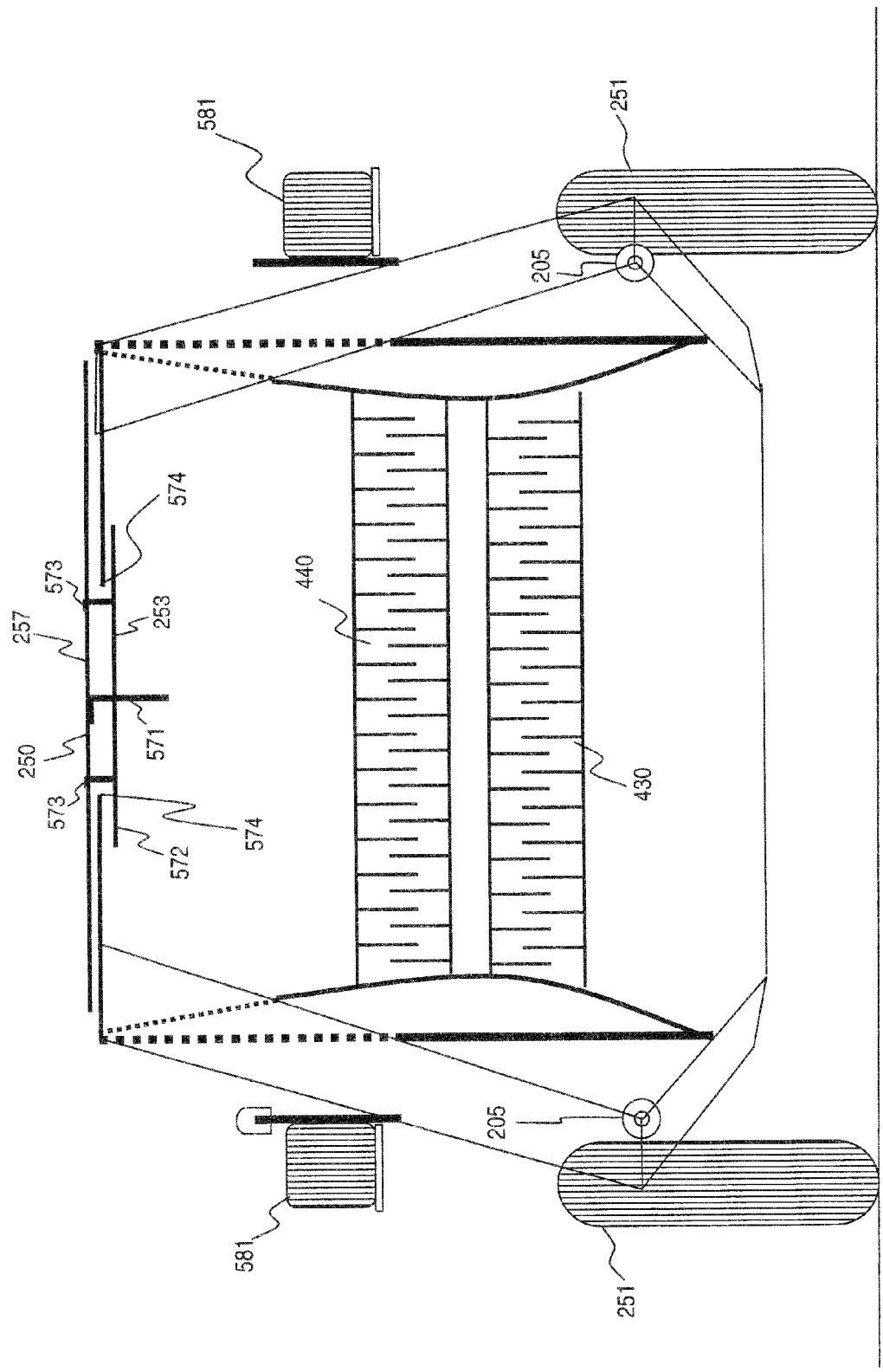
FIG. 7 is a bag-end view of a bagging machine 500.

FIG. 7 is a bag-end view of a bagging machine 500 of FIG. 5. In some embodiments, a vertical stiffening plate 571 is welded or otherwise attached at right angles to top wall 257 of tunnel 250. In some embodiments, a horizontal stiffening bar 572 and bolts 573 provide an additional stiffening mechanism 253 that works in concert with stiffening wall 571 to keep top wall 257 in place as the high-pressure feed is extruded from the tunnel 250. FIG. 7 also shows cable spools 581 that limit the rate of movement of mechanism 500 as feed 98 is pushed into the bag 99.

Figure 8:
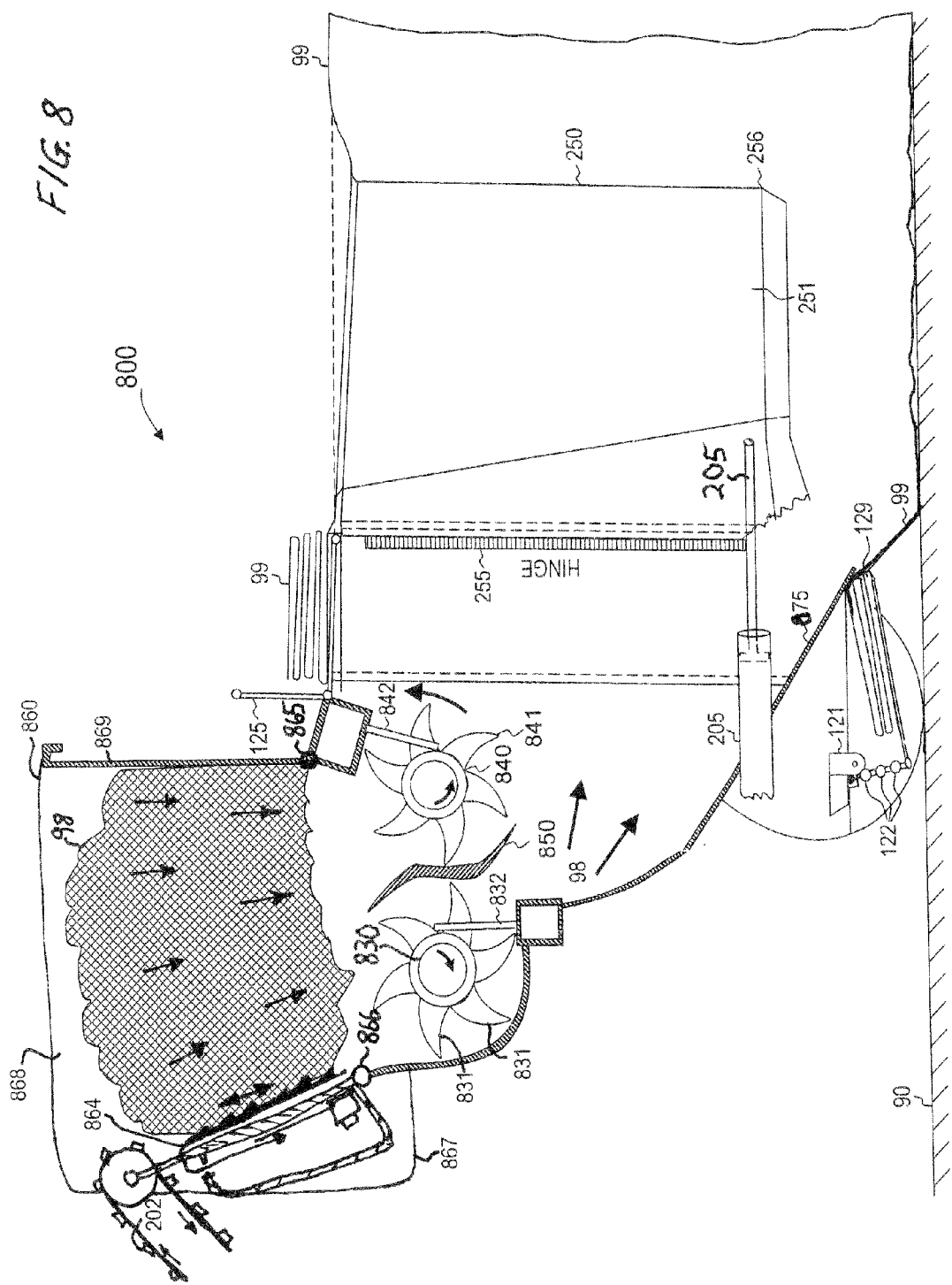
FIG. 8 is a side view of a bagging machine 800, according to still another embodiment of this invention, with the fold-down hopper 860 in the upright position.

FIG. 8 is a side view of a bagging machine 800, according to still another embodiment of this invention, with the fold-down hopper 860 in the upright position. In some embodiments, machine 800 is substantially similar to machine 400 of FIG. 4, but with compressor rotor 840 (which replaces compressor rotor 440 of FIG. 4) being more exposed on top, and with compressor rotor 830 (which replaces compressor rotor 430 of FIG. 4) being moved forward (to the left in the FIG. 8) and upward. This forces feed 98 by its own weight into both compressor rotor 830 and compressor rotor 840 In some embodiments, compressor rotor 830 is positioned about as high as compressor rotor 840, with both being positioned such that the top reach of their teeth 831 and 841 are about as high as the top of tunnel 250, in order to efficiently empty hopper 860 and to provide additional compaction of feed (i.e., a higher compaction factor) at the top of the filled bag 99.

In some embodiments, a generally vertical feed-director plate 850 is mounted transverse (from the far side to the near side of hopper 860 in FIG. 8) that functions to keep feed being pushed into bag 99 from escaping around the ends of teeth 831 of the front rotor 830 and teeth 841 of back rotor 840. In some embodiments, plate 850 is curved in a generally concave cylinder shape (facing forward) along part of its height (e.g., the upper half in the embodiment shown in FIG. 8) to generally conform to the path of the tips of teeth 831, and a generally concave cylinder shape (facing backward) along part of its height (e.g., the lower half in the embodiment shown in FIG. 8) to generally conform to the path of the tips of teeth 841.

In some embodiments, in order to improve the compaction factor in the upper regions of the filled bag, the centers of rotation of compressor rotor 830 and of compressor rotor 840 are configured, when operating, to both be above 42 inches (109 cm) above the ground 90. In other embodiments, they are both above 48 inches (121 cm) above the ground 90. In other embodiments, they are both above 54 inches (137 cm) above the ground 90. In other embodiments, they are both above 60 inches (152 cm) above the ground 90. In other embodiments, they are both above 66 inches (167 cm) above the ground 90. In other embodiments, they are both above 72 inches (182 cm) above the ground 90. In other embodiments, they are both above 78 inches (198 cm) above the ground 90. In other embodiments, they are both above 84 inches (213 cm) above the ground 90. In some embodiments, the plastic bag 99 top of bag 99 into which the feed is compressed is up to seven feet (84 inches=213 cm) high or more when filled, so with in conventional baggers with the compressor rotor below the midpoint of bag height, the compressor must not only compress the feed, but push it upward in the bag to obtain a good compression factor (and thus better feed preservation) for the feed in the upper bag.

In some embodiments, the rotational axis of compressor rotor 830 and the rotational axis of compressor rotor 840, when operating, are configured to both be above about 55% of the filled-bag height above the ground 90. In other embodiments, they are both about above 60% of the filled-bag height above the ground 90 when operating. In other embodiments, they are both about above 65% of the filled-bag height above the ground 90 when operating. In other embodiments, they are both about above 70% of the filled-bag height above the ground 90 when operating. In other embodiments, they are both about above 75% of the filled-bag height above the ground 90 when operating. In other embodiments, they are both about above 80% of the filled-bag height above the ground 90 when operating. In other embodiments, they are both about above 85% of the filled-bag height above the ground 90 when operating. In other embodiments, they are both about above 90% of the filled-bag height above the ground 90 when operating. In other embodiments, they are both about above 95% of the filled-bag height above the ground 90 when operating. In other embodiments, they are both about above 100% of the filled-bag height above the ground 90 when operating.

Figure 9:
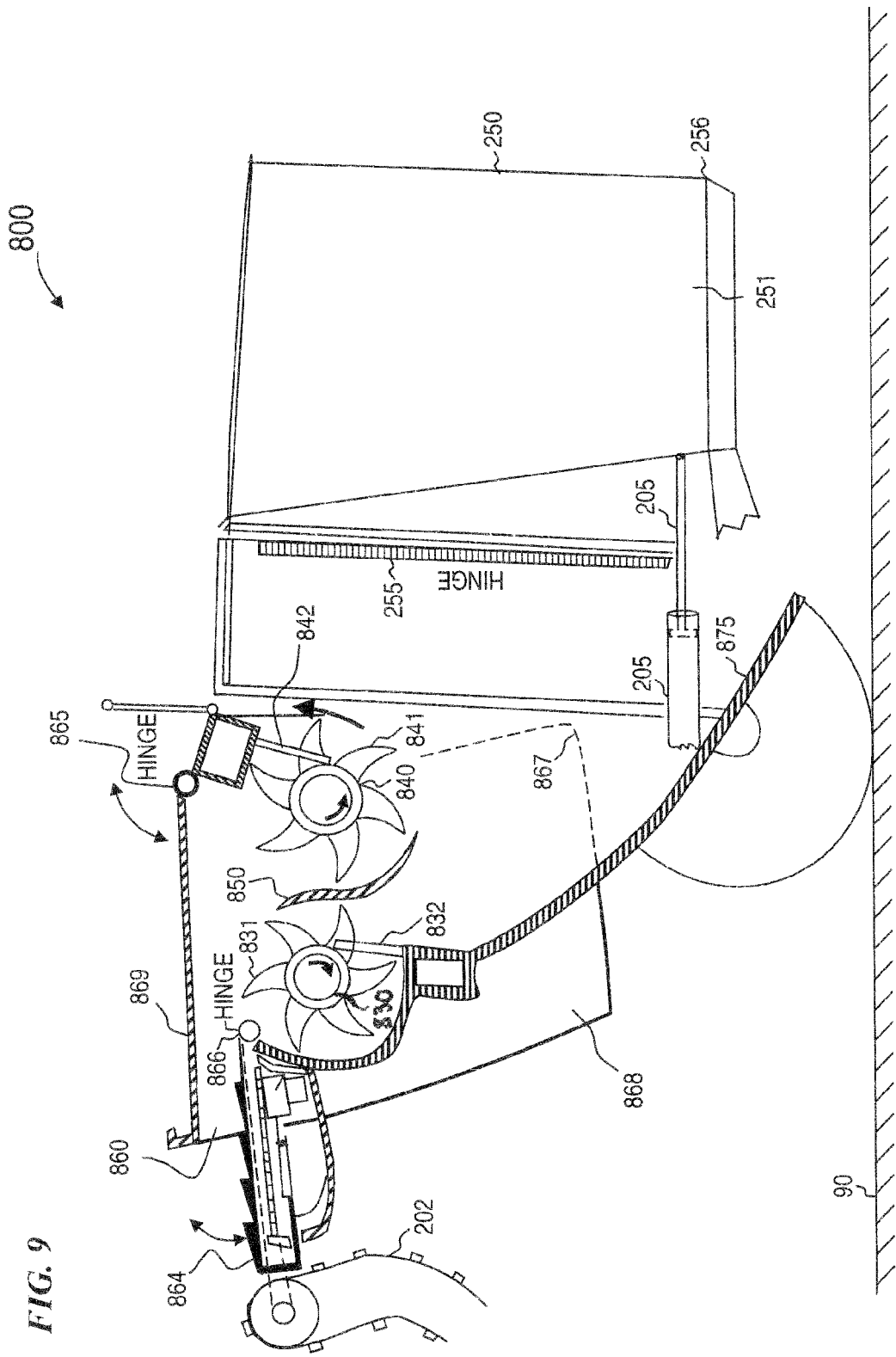
FIG. 9 is a side view of a bagging machine 800, according to still another embodiment of this invention, with the fold-down hopper 860 in the folded-down position.

In some embodiments, compressor rotor 830 and of compressor rotor 840 are mounted so high that hopper 860, when operating, that hopper 860 must also be quite high when operating. In order to provide a more compact shape for traveling on highways or for storing bagger 800 in a shed, in some embodiments, hopper 860 is configured to be folded or otherwise manipulated to provide a compact shape when not operating and a functional tall shape when operating. In some embodiments, hopper 860 has a back wall 869 and two sidewalls 868 that are configured to swing around hinge 865 into a temporarily fixed upright position as shown in FIG. 8, or into a temporarily fixed folded position as shown in FIG. 9. In some embodiments, front wall 864 is also configured to swing around hinge 866 into a temporarily fixed upright position as shown in FIG. 8, or into a temporarily fixed folded position as shown in FIG. 9. In some embodiments, front wall 864 (e.g., as shown) is of the moving-wall configuration described in FIG. 3, and having a conveyor belt system 202 for lifting feed from a loading bed (e.g., 203 of FIG. 3) into hopper 860, where conveyor-belt system 202 also folds down.

FIG. 9 is a side view of a bagging machine 800, according to still another embodiment of this invention, with the fold-down hopper 860 in the folded-down position. This compact configuration makes bagger machine 800 more suitable for moving or storage. For example, in some embodiments, bagger 800 can be folded and then loaded into the truck bed of a truck (such as truck 310 of FIG. 3) for highway transport. If the bagger is too high (e.g., with a high hopper) such transport is infeasible.

One aspect of the invention, in some embodiments, includes an agricultural bagger apparatus for compacting feed into a horizontally deployed bag, wherein the tunnel exit opening has a variably sized cross-sectional area opening 256 and/or a plurality of toothed compression mechanisms 430 and 440. The counter rotating toothed compression mechanisms force a larger amount of feed with a higher pressure into tunnel 250, thus preventing stalling of the mechanism that typically occurs with a single input compression mechanism (e.g., compressor 130 of FIG. 1). The variable width tunnel 250 compensates for variability in feed pressure that otherwise occurs when using a plurality of compression mechanisms 430 and 440.

One aspect of the invention, in some embodiments, includes an agricultural bagger apparatus for compacting feed into a horizontally deployed bag. This apparatus includes a primary compression mechanism, and a hopper that receives agricultural feed, the hopper further including: an input hopper portion that includes a first hopper wall, and a lower end exit chute connected to the primary compression mechanism, wherein a major portion of the hopper wall moves relative to the rest of the hopper to urge feed towards the primary compression mechanism.

In some embodiments of the apparatus, the first hopper wall is a sloped wall that moves in an oscillating motion.

In some embodiments of the apparatus, the first hopper wall includes a first ridge, and a second ridge wherein the first and second ridges are configured to push the agricultural feed in the hopper toward the primary compression mechanism as the first hopper wall moves.

In some embodiments of the apparatus, the first hopper wall is a sloped wall that moves in an oscillating up-and-down motion.

In some embodiments of the apparatus, the first hopper wall further includes an inner wall plate, an outer wall plate, an end wall connecting the inner wall to the outer wall plate, a linkage point attached to a portion of at least one of the inner wall, the outer wall and the end wall, and a wall moving mechanism attached to the linkage point to move the first hopper wall.

In some embodiments of the apparatus, the linkage point is attached to a surface of the first hopper wall isolated from a surface of the first hopper wall that contacts feed.

Some embodiments of the apparatus further include a safety enclosure attached to the first hopper to enclose a portion of the first hopper wall, the linkage point and the wall-moving mechanism.

Some embodiments of the apparatus further include at least one grease path having a first end on an exterior surface of the safety enclosure and a second end connect to a moving joint of the wall-moving mechanism.

In some embodiments of the apparatus, the wall moving mechanism further include a sprocket, and a rotating linkage arm attached between the sprocket and the linkage point.

In some embodiments of the apparatus, the wall moving mechanism further includes: a sprocket, a first linkage arm attached to the sprocket, and a second linkage arm attached to the first linkage arm and the linkage point.

In some embodiments of the apparatus, the wall moving mechanism further includes a chain, the chain attached to drive power between the sprocket and the primary compression mechanism.

Some embodiments of the apparatus further include a secondary compression mechanism located near the primary compression mechanism.

Some embodiments of the apparatus further include an output tunnel, and a secondary compression means for further compacting feed primarily in an upper portion of the tunnel.

In some embodiments of the apparatus, the primary compression mechanism rotates in a first direction and the secondary compression mechanism rotates in a second direction different from the first direction.

In some embodiments of the apparatus, the primary compression mechanism further comprises a first set of teeth and wherein the secondary compression mechanism includes a second set of teeth, the first set of teeth interdigitated with the second set of teeth as the primary compression mechanism rotates and the second compression mechanism rotates.

Some embodiments of the apparatus further include a tunnel, wherein the primary compression mechanism is located near a first portion of the tunnel, and an upper compression mechanism located near a second portion of the tunnel, the upper compression mechanism connected to the tunnel to further compress feed at a distance above the primary compression mechanism and toward an upper portion of the tunnel cavity.

In some embodiments of the apparatus, the first hopper wall includes a plastic end portion and wherein the apparatus further comprises a plastic bearing plate associated with at least a portion of the hopper, the plastic end portion of the hopper wall contacting the plastic bearing plate as the hopper wall moves.

Some embodiments of the apparatus further include a tunnel, wherein the primary compression mechanism is located near a first portion of the tunnel, and an exit surface positioned between an exit end of the primary compression mechanism and the tunnel, wherein the exit surface is substantially vertically orientated.

Some embodiments of the apparatus further include a tunnel, wherein the primary compression mechanism is located near a first portion of the tunnel, and an exit surface positioned between an exit end of the primary compression mechanism and the tunnel, wherein the exit surface is sloped over a distance less than the diameter of the primary compression mechanism.

An aspect of some embodiments of the invention includes a method for improving the flow of agricultural feed in an agricultural feedstock-bagging machine having a tunnel and a primary compression mechanism fed by a hopper. This method includes providing the hopper with at least two walls, and moving a major portion of at least one of the two walls of the hopper relative to the other wall.

Some embodiments of the method further include sloping the major portion of at least one of the two walls of the hopper toward the primary compression mechanism.

Some embodiments of the method further include covering a mechanism for moving a major portion of at least one of the two walls of the hopper.

Some embodiments of the method further include conducting grease to a moving major portion of at least one of the two walls of the hopper from a connector at a position remote from the mechanism.

An aspect of some embodiments of the invention includes an apparatus for compacting feed into a horizontally deployed bag, the apparatus including an input hopper, and means, as described herein and equivalents thereto, and means for moving a major portion of at least one wall of the hopper.

Some embodiments of the apparatus further include means, as described herein and equivalents thereto, for placing grease on a sliding interface of the at least one wall of the hopper.

It is specifically contemplated that the present invention includes embodiments having combinations and subcombinations of the various embodiments and features that are individually described herein including those described in the patents and applications incorporated by reference (i.e., some of the features from one embodiment combined with some of the features of another embodiment). Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method for improving the flow of agricultural feed in an agricultural feed stock bagging machine having an extrusion tunnel that has an exit opening, wherein the exit opening has a cross-sectional area, and a primary compression mechanism, the method comprising:
   forcing feed into the tunnel;
   deploying a bag around an exterior circumference around the extrusion tunnel at the exit opening; and
   providing a non-moving top wall, a first sidewall, and a second sidewall of the tunnel, wherein the first and second sidewalls each have a top wall portion extending toward a center line and forming a planar surface that is parallel to the top wall, and wherein the top wall portions of the first and second sidewalls each have an inner edge that moves toward and away from an inner edge of the top portion of the opposite sidewall;
   hingedly connecting the first sidewall and the second sidewall to a front portion of the tunnel;
   varying a position of the first sidewall and the second sidewall of the tunnel over time relative to the top wall by forcing the first and second sidewalls toward one another while sliding the top wall portions of the first and second sidewalls across a surface of the top wall in order to provide a change in the exterior circumference of the extrusion tunnel at the exit opening and a change in the cross-sectional area of the extrusion tunnel's exit opening and a change in a rate of taper of the sidewalls of the tunnel.

2. The method of claim 1, wherein the varying of the position of the first sidewall and the second sidewall includes moving at least one sidewall of the tunnel inwardly in order to reduce the exterior circumference of the tunnel at the exit opening in order to control a desired amount of compaction of the feed at each of a plurality of positions along the length of the deployed bag.

3. The method of claim 2, wherein the moving of the first sidewall and the second sidewall is accomplished by extending a hydraulic cylinder.

4. The method of claim 2, wherein the moving of the first sidewall and the second sidewall is accomplished by extending a hydraulic cylinder that is attached to the sidewall proximate to a vertex between at least two substantially flat plates forming at least a portion of the sidewall.

5. The method of claim 1, wherein the forcing of feed into the tunnel is accomplished by forcing the feed between counter-rotating toothed compression mechanisms.

6. The method of claim 5, wherein the forcing of feed into the tunnel is accomplished by forcing the feed between the counter-rotating toothed compression mechanisms having their rotational axis located above about 60% of the filled-bag height above the ground.

7. The method of claim 1, further comprising stiffening at least one wall of the tunnel with a plate affixed to and oriented substantially perpendicular to the wall being stiffened.

8. An agricultural bagger apparatus for compacting agricultural feed stock into a horizontally deployed bag, the apparatus comprising:
   an extrusion tunnel that has an exit opening, wherein the exit opening has a cross-sectional area, wherein the extrusion tunnel includes a plurality of walls including a non-moving top wall, a first sidewall, and a second sidewall, wherein the first and second sidewalls each have a top wall portion extending toward a center line and forming a planar surface that is parallel to the top wall, wherein the top wall portions of the first and second sidewalls have an inner edge that moves toward and away from an inner edge of the top portion of the opposite sidewall, and wherein the first sidewall and the second sidewall are hingedly connected to a front portion of the tunnel, wherein the first sidewall and the second sidewall are movable relative to the top wall, and wherein the bagger apparatus is configured such that in operation the bag is deployed around an exterior circumference around the extrusion tunnel;
   a primary compression mechanism operable to receive feed from a hopper and force the feed into the extrusion tunnel; and
   an actuator operatively coupled to the first sidewall and the second sidewall and operable to vary a position of the first sidewall and the second sidewall over time relative to the top wall in order to provide a change in the exterior circumference of the extrusion tunnel at the exit opening and a change in the cross-sectional area of the extrusion tunnel's exit opening and a change in a rate of taper of the sidewalls of the tunnel.

9. The apparatus of claim 8, wherein the actuator is operable to move the first sidewall and the second sidewall inwardly in order to reduce the exterior circumference of the tunnel at the exit opening and thus vary a transverse cross-sectional area of the tunnel at the exit opening in order to control a desired amount of compaction of the feed at each of a plurality of positions along the length of the deployed bag.

10. The apparatus of claim 9, wherein the actuator includes a first hydraulic cylinder that is operable to extend its length in order to control movement of the first sidewall and a second hydraulic cylinder that is operable to extend its length in order to control movement of the second sidewall.

11. The apparatus of claim 10, wherein the first sidewall includes at least two flat plate portions, wherein the two flat plate portions meet at an angled vertex, and wherein the first hydraulic cylinder is attached to the sidewall proximate to the vertex.

12. The apparatus of claim 8, wherein the primary compression mechanism includes a rotational axis located above about 60% of the filled-bag height above the ground.

13. The apparatus of claim 8, wherein the top wall is in a fixed orientation relative to the primary compression mechanism.

14. The apparatus of claim 8, wherein the top wall includes a stiffening plate attached to the top wall along a line parallel to a direction of feed movement along the top wall at a substantially right angle to the top wall.

15. The apparatus of claim 8, wherein the primary compression mechanism includes a rotational axis located above about 75% of the filled-bag height above the ground.

16. The apparatus of claim 8, wherein the primary compression mechanism includes two counter-rotating toothed rotors that force feed into the tunnel.

17. An agricultural bagger apparatus for compacting feed into a horizontally deployed bag, the apparatus comprising:
- an extrusion tunnel that has an exit opening, wherein the exit opening has a cross-sectional area, wherein the bag is deployed around an exterior circumference of the extrusion tunnel at the exit opening;
- an input hopper;
- a primary compression mechanism operable to receive feed from the hopper and force the feed into the extrusion tunnel;
- a non-moving top wall, a first sidewall, and a second sidewall, wherein the first and second sidewalls each have a top wall portion extending toward a center line and forming a planar surface that is parallel to the top wall, and wherein the top wall portions of the first and second sidewalls have an inner edge that moves toward and away from an inner edge of the top portion of the opposite sidewall;
- means for hingedly connecting the first sidewall and the second sidewall to a front portion of the tunnel; and
- means for varying a position of the first sidewall and the second sidewall of the tunnel over time relative to the top wall in order to provide a change in the exterior circumference of the extrusion tunnel at the exit opening and a change in the cross-sectional area of the extrusion tunnel's exit opening and a change in a rate of taper of the sidewalls of the tunnel.

18. The apparatus of claim 17, wherein the means for varying the position of the first sidewall and the second sidewall includes means for moving at least one sidewall of the tunnel inwardly in order to reduce the exterior circumference of the tunnel at the exit opening in order to control a desired amount of compaction of the feed at each of a plurality of positions along the length of the deployed bag.

19. The apparatus of claim 18, wherein the means for varying the position of the first sidewall and the second sidewall includes a hydraulic cylinder.

20. The apparatus of claim 17, wherein the primary compression mechanism includes counter-rotating toothed means for forcing feed into the tunnel.

21. The apparatus of claim 20, wherein the counter-rotating toothed means includes a rotational axis located above about 60% of the filled-bag height above the ground.

22. The apparatus of claim 17, wherein the top wall is in a fixed orientation relative to the primary compression mechanism, wherein the top wall includes a stiffening plate attached to the top wall along a line parallel to a direction of feed movement along the top wall at a substantially right angle to the top wall.

* * * * *